United States Patent
Goto

(10) Patent No.: US 10,021,622 B2
(45) Date of Patent: Jul. 10, 2018

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Fumihide Goto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/786,128

(22) PCT Filed: Apr. 18, 2014

(86) PCT No.: PCT/JP2014/002211
§ 371 (c)(1),
(2) Date: Oct. 21, 2015

(87) PCT Pub. No.: WO2014/174816
PCT Pub. Date: Oct. 30, 2014

(65) Prior Publication Data
US 2016/0073323 A1 Mar. 10, 2016

(30) Foreign Application Priority Data
Apr. 26, 2013 (JP) ................................. 2013-093887

(51) Int. Cl.
*H04W 4/00* (2018.01)
*H04W 48/02* (2009.01)
(Continued)

(52) U.S. Cl.
CPC ........... *H04W 48/02* (2013.01); *H04W 8/005* (2013.01); *H04M 1/7253* (2013.01); *H04W 84/12* (2013.01); *H04W 92/18* (2013.01)

(58) Field of Classification Search
CPC ... H04W 48/02; H04W 8/005; H04W 76/023; H04W 84/12; H04W 92/18; H04M 1/7253
(Continued)

(56) References Cited

U.S. PATENT DOCUMENTS 7,711,344 B1 * 5/2010 Mahn ................. H04M 3/38
370/328
2006/0239190 A1 10/2006 Kumar
(Continued)

FOREIGN PATENT DOCUMENTS

JP 2011-35768 A 2/2011
JP 2011-135166 A 7/2011

*Primary Examiner* — Faisal Choudhury
(74) *Attorney, Agent, or Firm* — Canon U.S.A., Inc. IP Division

(57) ABSTRACT

A communication apparatus includes a connecting unit configured to execute connection processing with another communication apparatus, a receiving unit configured to receive a request signal for causing said another communication apparatus to acquire service information provided by the communication apparatus before the connection processing with said another communication apparatus is executed by the connecting unit, and a transmitting unit configured to transmit a response signal including the service information in a case where the request signal is received by the receiving unit. In the communication apparatus, the transmitting unit restricts transmission of the response signal according to a predetermined condition.

12 Claims, 7 Drawing Sheets

(51) Int. Cl.
*H04W 8/00* (2009.01)
*H04W 84/12* (2009.01)
*H04M 1/725* (2006.01)
*H04W 92/18* (2009.01)

(58) Field of Classification Search
USPC .................................................. 370/338
See application file for complete search history.

(56) References Cited

U.S. PATENT DOCUMENTS

| | | | | |
|---|---|---|---|---|
| 2006/0268767 | A1* | 11/2006 | Sato | H04W 28/20 370/328 |
| 2010/0322213 | A1* | 12/2010 | Liu | H04L 67/16 370/338 |
| 2011/0149816 | A1 | 6/2011 | Saito | |
| 2012/0218918 | A1* | 8/2012 | Takae | H04W 8/005 370/255 |
| 2013/0034023 | A1 | 2/2013 | Jung | |
| 2013/0109313 | A1* | 5/2013 | Kneckt | H04W 8/005 455/41.2 |
| 2013/0204962 | A1* | 8/2013 | Estevez | H04N 7/185 709/217 |
| 2013/0230035 | A1* | 9/2013 | Grandhi | H04W 48/16 370/338 |
| 2013/0237216 | A1* | 9/2013 | Ong | H04W 8/005 455/434 |
| 2013/0250803 | A1* | 9/2013 | Abraham | H04L 67/16 370/254 |
| 2013/0331141 | A1* | 12/2013 | Montemurro | H04W 48/18 455/515 |
| 2014/0219157 | A1* | 8/2014 | Sukumar | H04W 4/06 370/312 |
| 2014/0242985 | A1* | 8/2014 | Kneckt | H04W 40/14 455/434 |
| 2015/0139207 | A1* | 5/2015 | Seok | H04W 48/14 370/338 |
| 2015/0230280 | A1* | 8/2015 | Dees | H04W 76/023 455/39 |
| 2015/0282229 | A1* | 10/2015 | Vedula | H04W 76/023 370/338 |
| 2016/0057237 | A1* | 2/2016 | Yang | H04L 67/16 709/224 |
| 2016/0135233 | A1* | 5/2016 | Fujita | G08C 17/00 370/329 |
| 2016/0143072 | A1* | 5/2016 | Kondabattini | H04W 76/023 455/39 |

* cited by examiner

[Fig. 1]
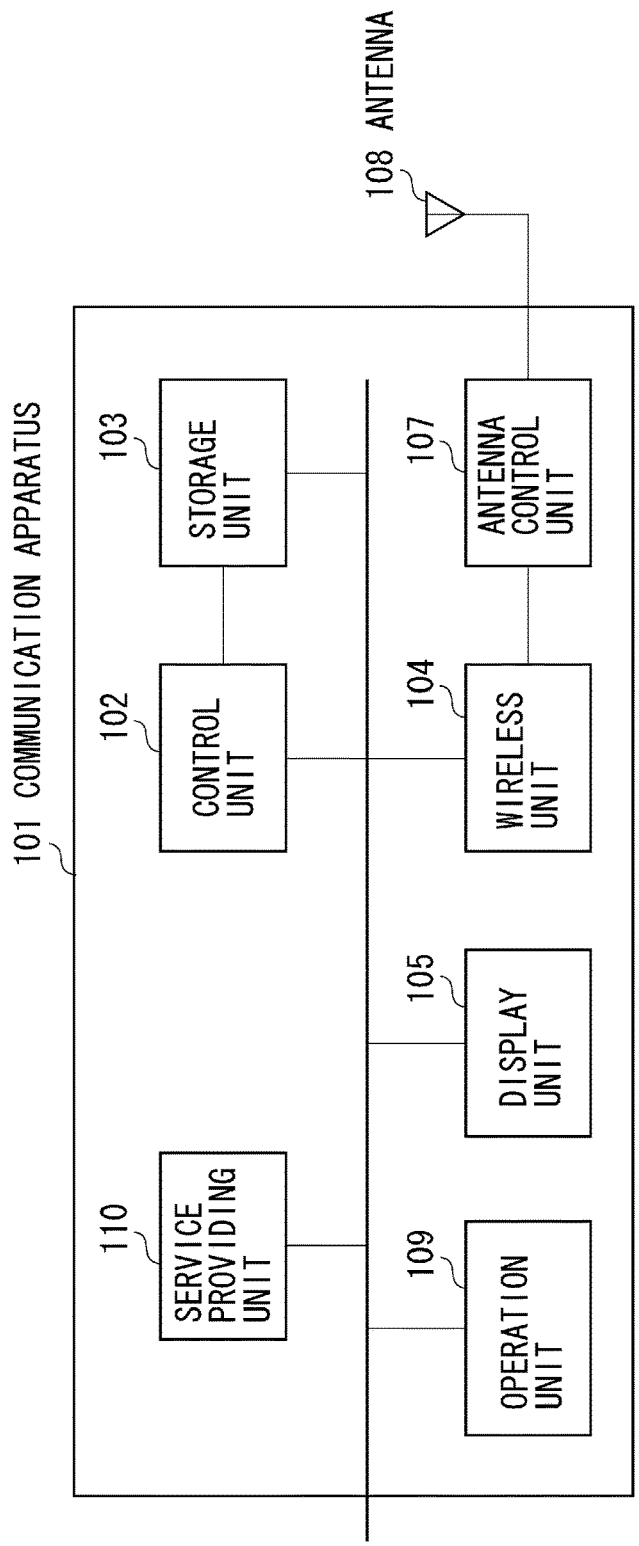

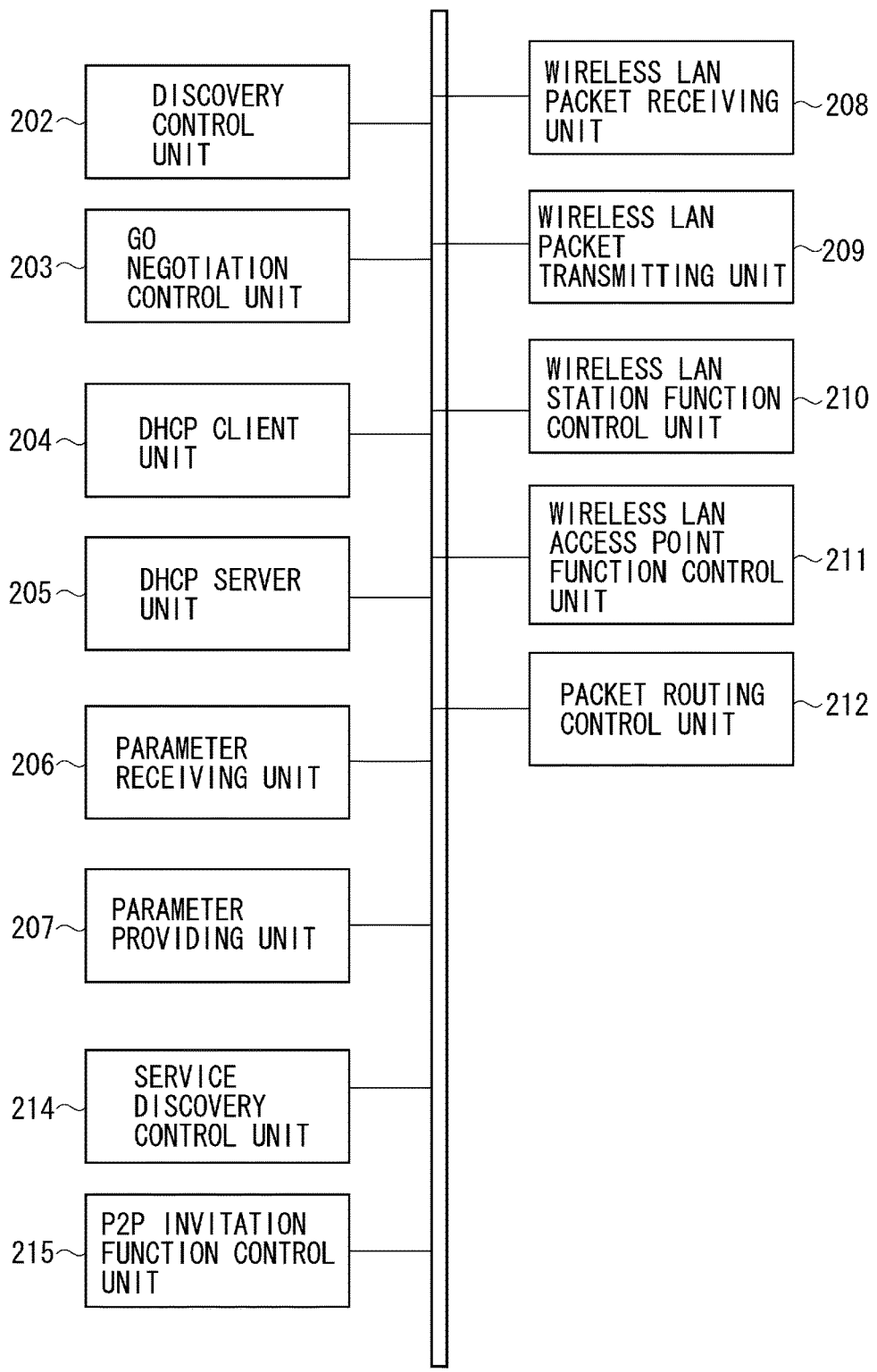
[Fig. 2]

[Fig. 3]
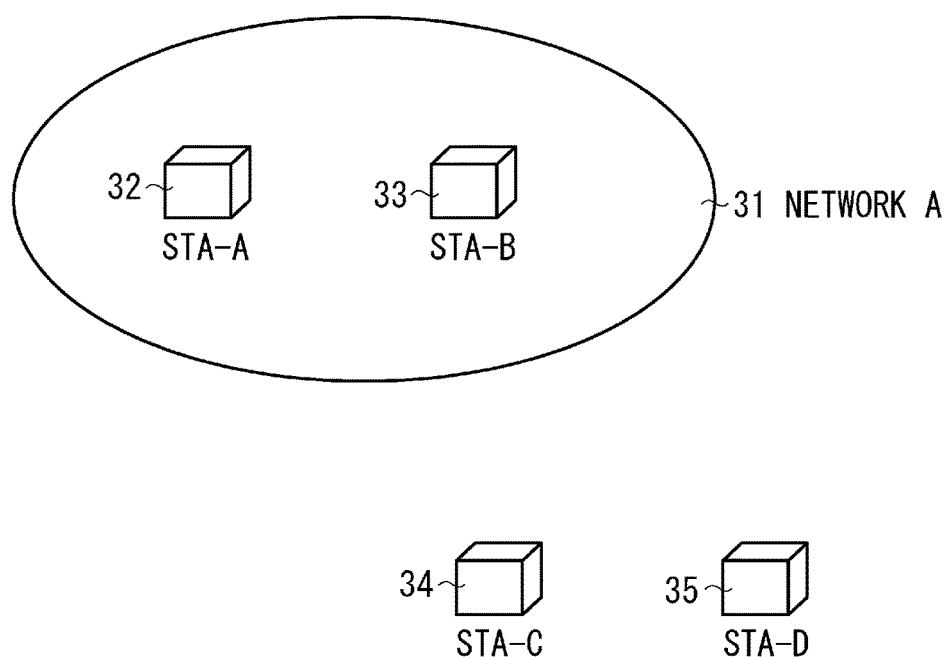

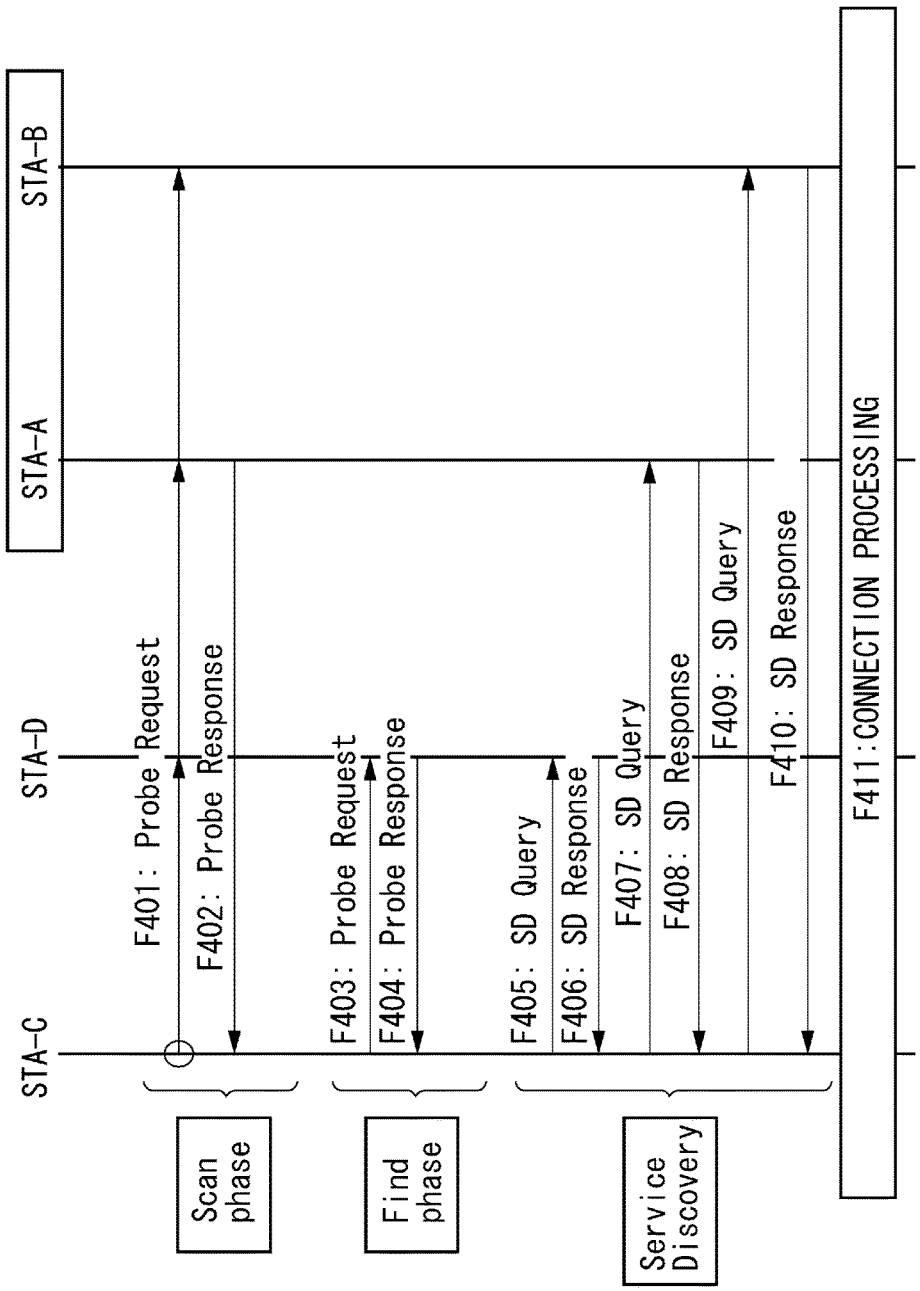
[Fig. 4]

[Fig. 5]
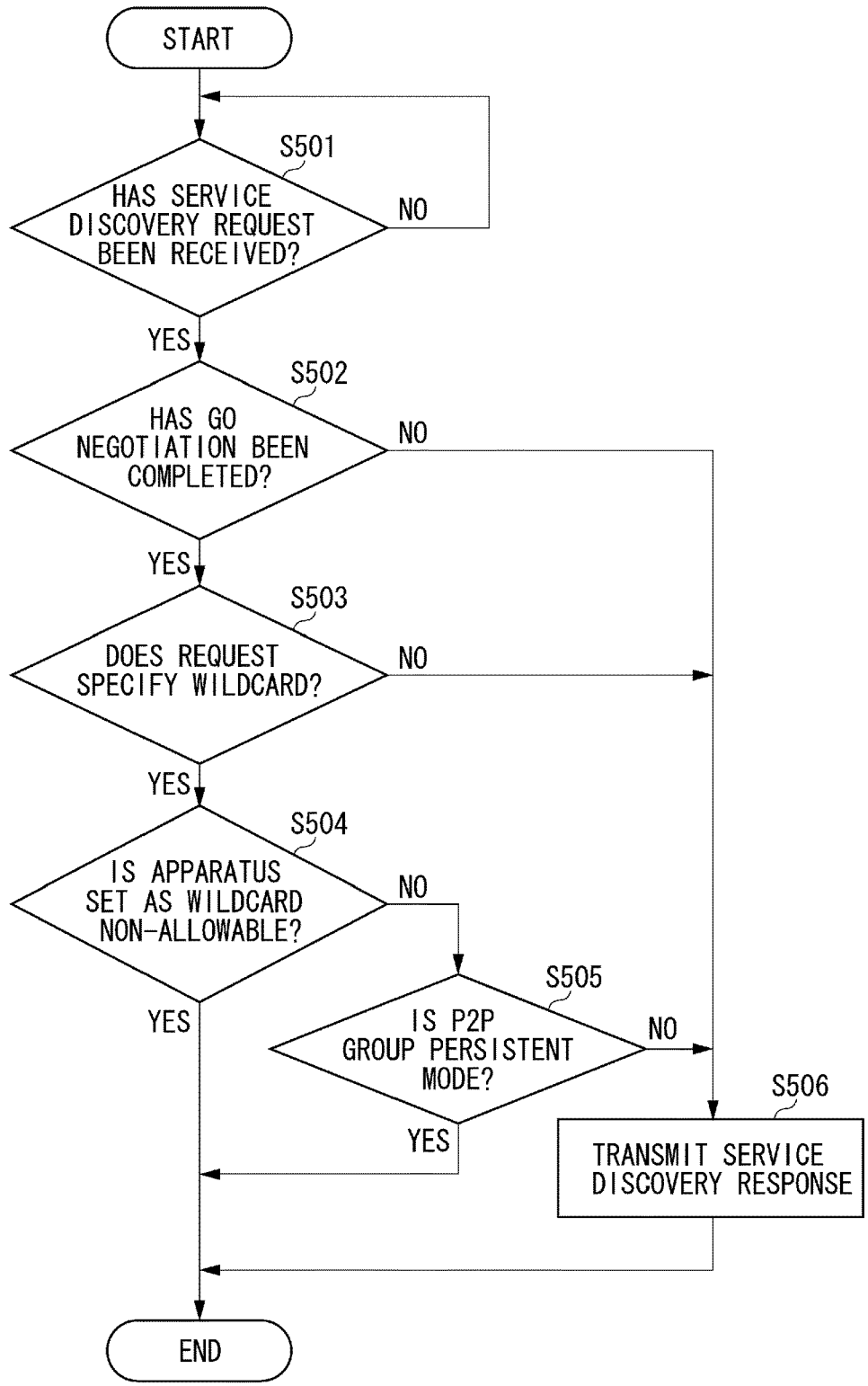

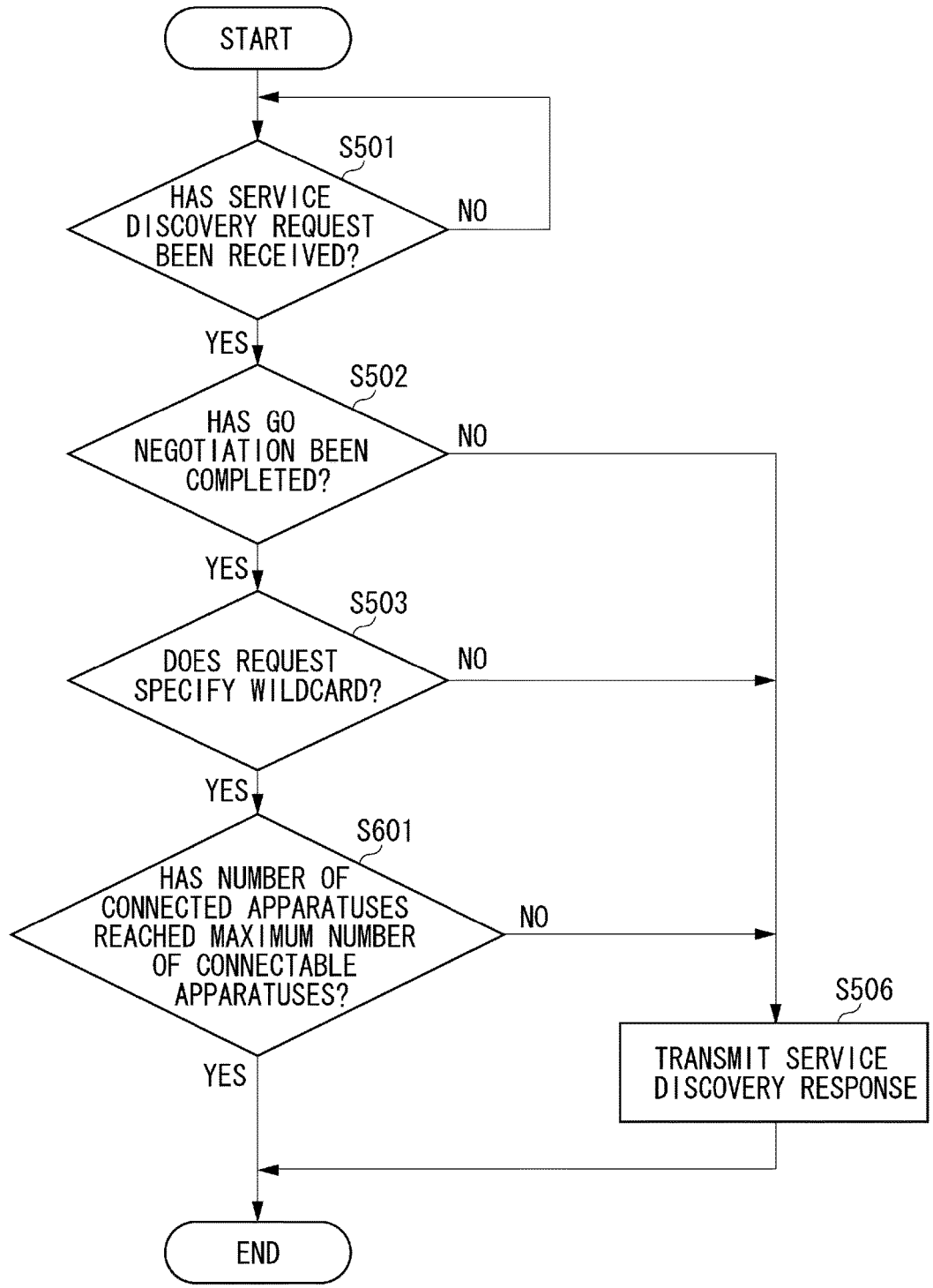

[Fig. 7]
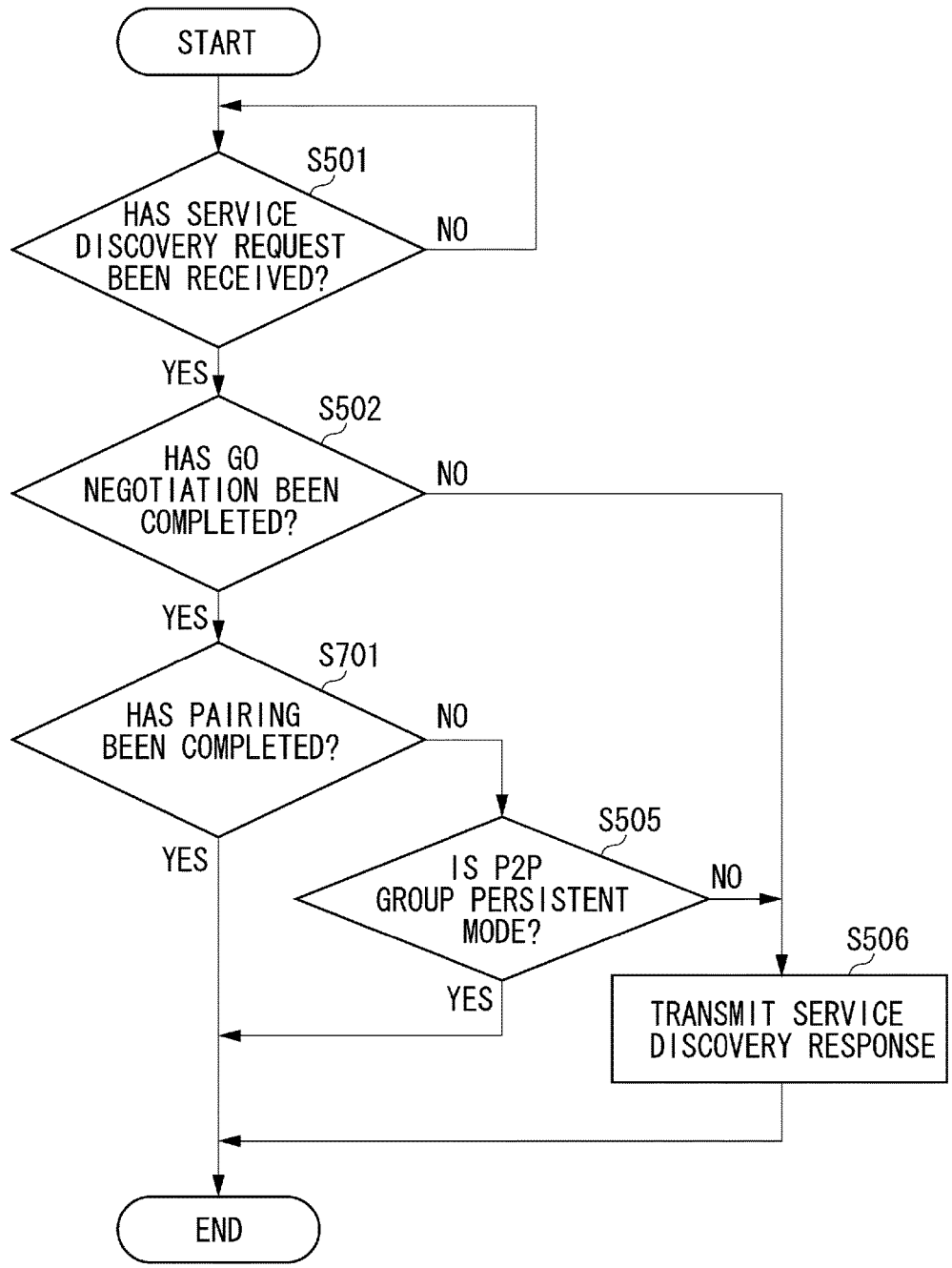

COMMUNICATION APPARATUS, CONTROL METHOD FOR COMMUNICATION APPARATUS, AND STORAGE MEDIUM

TECHNICAL FIELD

The present invention relates to a communication apparatus which transmits service information of the communication apparatus.

BACKGROUND ART

In recent years, there has been increased opportunity of using an electronic apparatus such as a digital camera or a printer as a communication apparatus by providing a wireless local area network (LAN) function and connecting to a wireless LAN. For example, PTL 1 discloses a method for easily sharing an image by providing a wireless LAN function to a digital camera.

Further, in many cases, in order to make electronic apparatuses directly connect to each other, an access point function (base station function) of the wireless LAN is built in the electronic apparatus. In general, when the electronic apparatus is provided with the wireless LAN access point function, the electronic apparatus is also provided with a dynamic host configuration protocol (DHCP) server function for controlling the allocation of an internet protocol (IP) address.

In addition, Wi-Fi Direct (registered trademark) standard is established by Wi-Fi Alliance. Wi-Fi Direct specifies a protocol for automatically determining whether to make each of the electronic apparatuses operate as a wireless LAN access point or a wireless LAN station.

Furthermore, as an optional function, Wi-Fi Direct also specifies a service discovery function, i.e., a function for advertising and searching for information of a service (service information) supported by an application included in the electronic apparatus. By using the service discovery function, the electronic apparatus can acquire service information stored in another electronic apparatus which serves as a connection destination before executing connection processing.

Using the service discovery function enables the electronic apparatus to acquire the service information provided by a communication destination apparatus before connecting thereto. However, there is a problem in which the service information of own apparatus is also notified to the communication destination apparatus, even if the own apparatus has already provided the service to a different communication destination apparatus, or the own apparatus is not supposed to provide the service to that communication destination apparatus.

The present invention is directed to a method for restricting transmission of service information according to a predetermined condition.

CITATION LIST

Patent Literature

Japanese Patent Application Laid-Open No. 2011-35768

SUMMARY OF INVENTION

Solution to Problem

According to an aspect of the present invention, a communication apparatus includes a connecting unit configured to execute connection processing with another communication apparatus, a receiving unit configured to receive a request signal for causing said another communication apparatus to acquire service information provided by the communication apparatus before the connection processing with said another communication apparatus is executed by the connecting unit, and a transmitting unit configured to transmit a response signal including the service information in a case where the request signal is received by the receiving unit. In the communication apparatus, the transmitting unit restricts transmission of the response signal according to a predetermined condition.

Further features of the present invention will become apparent from the following description of exemplary embodiments with reference to the attached drawings.

BRIEF DESCRIPTION OF DRAWINGS

FIG. 1 is a block diagram illustrating a configuration of an apparatus according to an exemplary embodiment.

FIG. 2 is a software function block diagram of the apparatus.

FIG. 3 is a diagram illustrating a network configuration.

FIG. 4 is a sequence diagram according to a first exemplary embodiment.

FIG. 5 is a flowchart illustrating connection processing according to the first exemplary embodiment.

FIG. 6 is a flowchart illustrating connection processing according to a second exemplary embodiment.

FIG. 7 is a flowchart illustrating connection processing according to a third exemplary embodiment.

DESCRIPTION OF EMBODIMENTS

Example 1

Various exemplary embodiments, features, and aspects of the invention will be described in detail below with reference to the drawings. Hereinafter, an exemplary embodiment employing a wireless LAN system compliant with the Institute of Electrical and Electronics Engineers (IEEE) 802.11 series will be described. However, the communication mode thereof is not limited to the wireless LAN compliant with the IEEE 802.11 series.

FIG. 1 is a hardware block diagram illustrating one configuration example of below-described units according to the present exemplary embodiment. The hardware block diagram of FIG. 1 illustrates an entire portion of a communication apparatus 101. A control unit 102 controls the entire portion of the communication apparatus 101 by executing a control program stored in a storage unit 103. The control unit 102 also executes setting control of communication parameters with other apparatuses. The control program executed by the control unit 102 and various types of information such as the communication parameters are stored in the storage unit 103. Various operations described below will be realized when the control unit 102 executes the control program stored in the storage unit 103.

A wireless unit 104 executes wireless LAN communication compliant with the IEEE 802.11 series. A display unit 105 displays various types of information, so as to function as a liquid crystal display (LCD) or a light emitting diode (LED) to output visually-recognizable information, or to function as a speaker to output audio information. The display unit 105 includes a function for outputting at least any one of the visual information and the audio information.

An antenna control unit 107 and an antenna 108 are included in the communication apparatus 101. A user executes various inputs through an operation unit 109 in order to operate the communication apparatus 101.

A service providing unit 110 includes a function for providing service information of an application-level provided by the communication apparatus 101. For example, the service providing unit 110 provides a printing function if the communication apparatus is a printer, and the service providing unit 110 provides an imaging function if the communication apparatus is a digital camera.

FIG. 2 is a block diagram illustrating one configuration example of software function blocks which will be realized when the control unit 102 executes the control program stored in the storage unit 103 of the communication apparatus 101. A discovery control unit 202 activates search processing in which the communication apparatus 101 searches for another communication apparatus that serves as a communication destination apparatus.

A GO negotiation control unit 203 executes control processing based on the protocol compliant with the Wi-Fi Direct standard, and determines as to which communication apparatus executes a wireless LAN access point function and which communication apparatus executes a wireless LAN station function. In Wi-Fi Direct, the communication apparatus which executes the wireless LAN access point function is referred to as a peer-to-peer (P2P) group owner (hereinafter, referred to as "GO"). Further, the communication apparatus which executes the wireless LAN station function is referred to as a P2P client (hereinafter, referred to as "CL"). A wireless LAN access point function control unit 211 (described below) is activated when the communication apparatus 101 operates as the GO, whereas a wireless LAN station function control unit 210 (described below) is activated when the communication apparatus 101 operates as the CL.

The GO establishes a wireless network, whereas the CL participates in the wireless network established by the GO. At this time, the CL transmits an association request (connection request) specified by the IEEE 802.11 series to the GO. Then, the GO that receives the association request transmits an association response (connection response) to the CL to complete the connection processing.

In addition, in Wi-Fi Direct, the network established by the GO is referred to as a P2P group. In the present exemplary embodiment, the network may be also referred to as a P2P group. Furthermore, in the present exemplary embodiment, a group of communication apparatuses compatible with Wi-Fi Direct is collectively referred to as a P2P device.

A DHCP client unit 204 is activated when the GO negotiation control unit 203 makes the communication apparatus 101 operate as the CL. A DHCP server unit 205 is activated when the GO negotiation control unit 203 makes the communication apparatus 101 operate as the GO.

A parameter receiving unit 206 receives a communication parameter necessary for the communication apparatus 101 to participate in the network. The communication parameter includes at least any one of a service set identifier (SSID) as a network identifier, an encryption method, an encryption key, an authentication method, and an authentication key, each of which is necessary to participate in the network. In the same manner as the DHCP client unit 204, the parameter receiving unit 206 is activated when the communication apparatus 101 operates as the CL. A parameter providing unit 207 provides the communication parameter. In the same manner as the DHCP server unit 205, the parameter providing unit 207 is activated when the communication apparatus 101 operates as the GO.

All kinds of packets including a communication protocol of an upper layer are respectively received and transmitted by a wireless LAN packet receiving unit 208 and a wireless LAN packet transmitting unit 209. A wireless LAN station function control unit 210 executes authentication and encryption processing when the communication apparatus 101 operates as the CL. A wireless LAN access point function control unit 211 executes the authentication and encryption processing, and management of the communication destination apparatus when the communication apparatus 101 operates as the GO. Either one of the functions of the wireless LAN station function control unit 210 and the wireless LAN access point function control unit 211 can be operated, or both of the functions thereof can be operated simultaneously.

When the wireless LAN access point function control unit 211 is operating, a packet routing control unit 212 relays a packet by executing bridge processing and routing processing of the packet.

A service discovery control unit 214 controls a service discovery function unique to Wi-Fi Direct. Through the service discovery function, the service discovery control unit 214 transmits and receives an action frame specified by the IEEE 802.11u in order to exchange the service information stored in the communication destination apparatus. Specifically, the service discovery control unit 214 transmits a service discovery (SD) query and receives an SD response as a reply. Alternatively, the service discovery control unit 214 receives the SD query from the communication destination apparatus and transmits the SD response as a reply.

A P2P invitation function control unit 215 controls an invitation function specified by the Wi-Fi Direct standard. Through the invitation function, either the GO or the CL which belongs to the network prompts a P2P device which does not belong to the network to connect to the network as a CL.

Further, all of the function blocks are mutually related to each other in terms of software or hardware. In addition, each of the above-described function blocks merely represents one example, and thus a plurality of the function blocks may be configured as a single function block, or any of the function blocks may be divided into a plurality of function blocks.

FIG. 3 is a diagram illustrating a system configuration established by a communication apparatus 32 (STA-A), a communication apparatus 33 (STA-B), a communication apparatus 34 (STA-C), and a communication apparatus 35 (STA-D). A network 31 (network A) is configured of the STA-A and the STA-B. Each of the STA-A through the STA-D includes the above-described configurations illustrated in FIGS. 1 and 2. Further, in the present exemplary embodiment, the STA-A operates as the GO, whereas the STA-B operates as the CL.

First, with reference to FIG. 4, description will be given to a case where the own communication apparatus is the STA-C. The STA-C is an apparatus which newly carries out Wi-Fi Direct to execute search processing specified by the Wi-Fi Direct standard.

When a user instructs activation of Wi-Fi Direct through the operation unit 109, in F401, the discovery control unit 202 transmits a probe request (search request) packet by broadcast. The search request packet is transmitted to an entire frequency channel (hereinafter, simply referred to as "channel") which the STA-C can use for communication.

When the STA-A serving as the GO of the network A receives the search request packet, in F402, the STA-A transmits a probe response (search response) packet as a response to the search request packet. Information such as address information of the CL (in this example, STA-B) connected to the GO is attached to the probe response transmitted by the GO.

The above state is referred to as a scan phase, i.e., a phase (step) for searching for the wireless LAN access points of a Wi-Fi Direct compatible apparatus and a Wi-Fi Direct non-compatible apparatus.

Thereafter, search processing for a Wi-Fi Direct compatible apparatus, referred to as a find phase, will be executed. In the find phase, standby processing (Listen) is executed on the channel specified in advance, and search processing (Search) will be executed thereon after elapse of a certain period of time. The channel used for the standby processing and the search processing is limited to a particular channel, and thus the communication destination apparatus can be searched within a shorter period of time than scanning the entire channels.

Specifically, in F403, the discovery control unit 202 transmits a probe request packet by broadcast. Then, in F404, the STA-D in a listen state returns a probe response packet.

Through the sequence of F401 through F404, the STA-C can recognize the existence of the STA-A, the STA-B, and the STA-D.

Subsequently, in order to acquire the service information provided by each communication apparatus, the service discovery control unit 214 executes service discovery processing. In the present exemplary embodiment, in order to acquire the service information, signals compliant with the Wi-Fi Direct specifications and the IEEE 802.11 series specifications will be employed. In specific, the SD query (service discovery request signal) and the SD response (service discovery response signal) as a response signal to the SD query will be employed. Further, the SD query specifies either a wildcard for acquiring the entire service information provided by the communication apparatus, or a specific query for acquiring presence/absence of the particular service information. In addition, the SD response includes the service information provided by the communication apparatus that transmits the SD response. However, the service information may be acquired by using signals different from the above-described signals.

In F405, the service discovery control unit 214 transmits the SD query to the STA-D. In F406, the STA-D transmits the SD response to the STA-C. Likewise, in F407, the service discovery control unit 214 transmits the SD query to the STA-A. In F408, the STA-C receives the SD response from the STA-A. Then, in F409, the service discovery control unit 214 transmits the SD query to the STA-B. In F410, the STA-C receives the SD response from the STA-B. Through the above sequence, the STA-C figures out the service information that is to be provided by the communication apparatus with which the STA-C can communicate. Further, the IEEE 802.11u specification documents or the Wi-Fi Direct specification documents may be referred with respect to the details thereof.

Thereafter, in F411, according to the selection input by the user through the operation unit 109, the STA-C determines the connection destination apparatus and executes predetermined connection processing. In the predetermined connection processing, the GO negotiation control unit 203 and the connection destination apparatus selected by the user determine as to which apparatus operates as the GO and which apparatus operates as the CL. Hereinafter, the above determination processing is referred to as role determination.

Then, the STA-C executes allocation of the IP address by activating the DHCP server unit 205 when the STA-C operates as the GO, and the STA-C executes the allocation of the IP address by activating the DHCP client unit 204 when the STA-C operates as the CL. Further, the STA-C executes sharing processing of the communication parameters by activating the parameter providing unit 207 when the STA-C operates as the GO, and the STA-C executes the sharing processing of the communication parameters by activating the parameter receiving unit 206 when the STA-C operates as the CL. The communication parameters are the identifier (SSID) of the network established by the communication apparatus and its connection destination apparatus, the encryption key, the encryption method, the authentication key, and the authentication method, each of which is used in the network. In the present exemplary embodiment, processing compliant with Wi-Fi Protected Setup (WPS) specified by Wi-Fi Direct is executed as the sharing processing of the communication parameters. However, the processing is not limited thereto. Then, the communication apparatus operating as the CL transmits an association request (connection request) to the apparatus operating as the GO, so that the connection processing with respect to the connection destination apparatus is completed.

FIG. 5 is a flowchart illustrating processing that is to be executed in a case where the STA-D operating as the communication apparatus receives a service discovery request from another communication apparatus. This processing flow will be realized when the control unit 102 reads and executes the control program stored in the storage unit 103.

First, in step S501, the service discovery control unit 214 determines whether the service discovery request has been received from another communication apparatus such as the STA-C. In a case where the service discovery request has not been received (NO in step S501), the service discovery control unit 214 waits until the service discovery request is received.

In a case where the service discovery request has been received (YES in step S501), the processing proceeds to step S502. In step S502, the service discovery control unit 214 determines whether the role determination (GO negotiation) of the own communication apparatus has been completed. With the determination processing, the service discovery control unit 214 determines whether the own communication apparatus is determined to be the GO apparatus or the CL apparatus. If the role determination has not been completed (i.e., if the role of the own communication apparatus has not been determined) (NO in step S502), the processing proceeds to step S506. In step S506, the service discovery control unit 214 transmits the response signal with respect to the service discovery request, and ends the service discovery processing.

Next, a state in which the GO negotiation has been completed and the role of the own communication apparatus has been determined will be considered. The above state may arise when a communication channel between the communication apparatus and its communication destination apparatus is established, or was once established by Wi-Fi Direct.

In this case, the processing will be branched depending on the content of the service discovery request. In step S503, the service discovery control unit 214 determines whether the request information of the received service discovery request specifies a wildcard.

If the service discovery control unit 214 determines that the request information thereof specifies a specific query (NO in step S503), the processing proceeds to step S506. In step S506, the service discovery control unit 214 transmits the response signal (SD response) with respect to the received service discovery request, and ends the service discovery processing.

On the other hand, in step S503, if the request information thereof specifies the wildcard (YES in step S503), the processing proceeds to step S504. In step S504, the service discovery control unit 214 determines whether the setting of the communication apparatus is wildcard non-allowable setting.

The setting information referred to as the wildcard non-allowable setting is the information for setting whether to return a response to the service discovery request when the service discovery request specifies the wildcard. Such setting information can be set as either "allowable" or "non-allowable". The setting information may be automatically determined by the system, or may be changeable by the user through the operation unit 109.

In a case where the setting information is set as "allowable", the service discovery control unit 214 transmits all the service information provided by the own communication apparatus as a response to the service discovery request that specifies the wildcard. In a case where the setting information is set as "non-allowable", the service discovery control unit 214 does not respond to the service discovery request that specifies the wildcard but only responds to the service discovery request that specifies the specific query.

In step S504, in a case where the wildcard non-allowable setting is set as "non-allowable" (YES in step S504), the service discovery control unit 214 does not transmit the response signal with respect to the received service discovery request and ends the processing. In other words, the service discovery control unit 214 restricts the transmission of the response signal (SD response) with respect to the service discovery request. The service discovery control unit 214 never transmits the response signal even if the same service discovery request is transmitted again.

On the other hand, in step S504, in a case where the wildcard non-allowable setting is set as "allowable" (NO in step S504), the processing proceeds to step S505. In step S505, the service discovery control unit 214 determines whether a mode of the P2P group of the own communication apparatus is a tentative network or a persistent network. The persistent network is a network established by a persistent mode specified by Wi-Fi Direct.

If the P2P group to which the own communication apparatus belongs is the persistent mode (YES in step S505), the service discovery control unit 214 does not transmit the response signal with respect to the received service discovery request and ends the processing. In other words, the service discovery control unit 214 restricts the transmission of the response signal (SD response) with respect to the service discovery request.

On the other hand, in step S505, in a case where the P2P group to which the own communication apparatus belongs is not the persistent mode (NO in step S505), the processing proceeds to step S506. In step S506, the service discovery control unit 214 transmits the response signal with respect to the received service discovery request.

In addition, in a case where the setting information is not set as the wildcard non-allowable (NO in step S504), the service discovery control unit 214 may advance the processing to step S506 without executing the processing in step S505. Furthermore, the processing in steps S504 and S505 may be omitted. In other words, in step S503, when the service discovery control unit 214 determines that the request information thereof specifies the wildcard, the service discovery control unit 214 may restrict the transmission of the response signal with respect to the service discovery request.

The service discovery control unit 214 may restrict the transmission of the response signal with respect to the service discovery request according to the determination result of any one of the conditions in steps S502, S503, and S505. In other words, as long as the GO negotiation has not been executed, the service discovery control unit 214 may restrict the transmission of the response signal with respect to the service discovery request. Further, in a case where the request information of the received service discovery request specifies the wildcard, the service discovery control unit 214 may restrict the transmission of the response signal with respect to the service discovery request. Furthermore, in a case where the P2P group to which the own communication apparatus belongs is the persistent mode, the service discovery control unit 214 may restrict the transmission of the response signal with respect to the service discovery request.

As described above, according to the present first exemplary embodiment, as to whether to respond to the service discovery request that specifies the wildcard can be determined by a predetermined condition such as user settings or a mode of the P2P group, and thus it is possible to prevent the communication apparatus from executing unnecessary connection processing.

Example 2

In the first exemplary embodiment, description has been given to an example of the communication apparatus configured to determine whether to respond to the service discovery request that specifies the wildcard according to the role of the own communication apparatus. In a second exemplary embodiment, description will be given to an example of the communication apparatus configured to determine whether to respond to the above request depending on whether the number of connected communication destination apparatuses has reached the maximum number of connectable communication apparatuses of the own communication apparatus.

Respective configurations of the hardware, the software function blocks, and the network are the same as those described in the first exemplary embodiment, and thus the description thereof will be omitted.

FIG. 6 is a flowchart illustrating processing that is to be executed in a case where the STA-D which operates as the communication apparatus receives a service discovery request from another communication apparatus. The processing flow will be realized when the control unit 102 reads and executes the control program stored in the storage unit 103.

In FIG. 6, at first, the service discovery control unit 214 executes the same processing as in steps S501 through S503 described in the first exemplary embodiment. Therefore, description of the processing in steps S501 through S503 will be omitted.

In the present exemplary embodiment, a condition in which the SD query (service discovery request signal) specifies the wildcard (i.e., processing that is to be executed when the determination result in step S503 is "YES") will be described. In such a case, in step S601, the service discovery control unit 214 determines whether the number of connected communication destination apparatuses has reached the maximum number of connectable communication apparatuses.

In step S601, in a case where the number of connected communication destination apparatuses has reached the maximum number of connectable communication apparatuses (YES in step S601), the service discovery control unit 214 ends the processing without transmitting the response signal with respect to the received service discovery request. In other words, the service discovery control unit 214 restricts the transmission of the response signal (SD response) with respect to the service discovery request. The service discovery control unit 214 never transmits the response signal even if the same service discovery request is transmitted again.

On the other hand, in a case where the number of connected communication destination apparatuses has not reached the maximum number of connectable communication apparatuses (NO in step S601), the processing proceeds to step S506. In step S506, the service discovery control unit 214 transmits the response signal with respect to the service discovery request and ends the processing.

As described above, according to the second exemplary embodiment, the communication apparatus can determine whether to respond to the service discovery request that specifies the wildcard depending on the maximum number of connectable communication apparatuses, and thus the communication apparatus can be prevented from transmitting unnecessary information to the communication destination apparatus that cannot be connected thereto.

Example 3

In the first exemplary embodiment, description has been given to an example of the communication apparatus configured to determine whether to respond to the service discovery request that specifies the wildcard according to a mode of the P2P group. In a third exemplary embodiment, description will be given to an example of the communication apparatus configured to perform the above-described determination depending on whether paring with the communication destination apparatus in an application-level has been completed. In the present exemplary embodiment, a pairing completion state (i.e., paired state) refers to a state where the setting that enables the two or more communication apparatuses to mutually communicate with one another for a predetermined service has been completed.

FIG. 7 is a flowchart illustrating processing that is to be executed in a case where the STA-D operating as the communication apparatus receives a service discovery request from another communication apparatus. The processing flow will be realized when the control unit 102 reads and executes the control program stored in the storage unit 103.

In FIG. 7, at first, the service discovery control unit 214 executes the same processing as in steps S501 and S502 described in the first exemplary embodiment. Therefore, description of the processing in steps S501 and S502 will be omitted.

In the present exemplary embodiment, a condition in which the GO negotiation has been completed and the role of the own communication apparatus has been determined (i.e., processing that is to be executed when the determination result in step S502 is "NO") will be described. The above state may arise when a communication channel between the communication apparatus and its communication destination apparatus is established, or was once established by Wi-Fi Direct.

In this case, in step S701, the service discovery control unit 214 branches the processing depending on whether the pairing thereof in a service layer has been completed. In step S701, the pairing completion state refers to a state where there is a connection history in an application-level.

In step S701, if the pairing thereof has been completed (YES in step S701), the service discovery control unit 214 ends the processing without transmitting the response signal with respect to the service discovery request. In other words, the service discovery control unit 214 restricts the transmission of the response signal (SD response) with respect to the service discovery request. The service discovery control unit 214 never transmits the response signal even if the same service discovery request is transmitted again.

On the other hand, in step S701, if the pairing thereof has not been completed (NO in step S701), the processing proceeds to step S505. In step S505, the service discovery control unit 214 determines whether a mode of the P2P group for the own communication apparatus is the tentative network or the persistent network (persistent mode).

In a case where the service discovery control unit 214 determines that the mode of the P2P group for the own communication apparatus is the persistent mode (YES in step S505), the service discovery control unit 214 ends the processing without transmitting the response signal with respect to the received service discovery request. In other words, the service discovery control unit 214 restricts the transmission of the response signal (SD response) with respect to the service discovery request.

Further, in step S505, in a case where the mode of the P2P group for the own communication apparatus is not the persistent mode (NO in step S505), the processing proceeds to step S506. In step S506, the service discovery control unit 214 transmits the response signal with respect to the received service discovery request. As described above, according to the present exemplary embodiment, when there is a connection history in the application-level, other communication apparatuses than those included in the connection history can be prevented from connecting thereto, and thus the convenience of the user can be improved.

The present invention may be realized in such a manner that a storage medium storing a program code of the software for realizing the above-described functions is supplied to a system or an apparatus, so that a computer (or a central processing unit (CPU) or a micro processing unit (MPU)) of the system or the apparatus reads out and executes the program code stored in the storage medium. In this case, the program code itself that is read from the storage medium realizes the functions described in the above exemplary embodiments, and thus the storage medium storing that program code constitutes the exemplary embodiments of the present invention.

For example, a flexible disk, a hard disk, an optical disk, a magneto-optical disk, a compact disc read only memory (CD-ROM), a compact disc recordable (CD-R), a magnetic tape, a non-volatile memory card, a ROM, or a digital versatile disc (DVD) can be used as a storage medium for supplying the program code.

The above-described functions may be realized when the computer reads and executes the program code. In addition, the above-described functions may be also realized when an operating system (OS) operating on the computer executes all or a part of the actual processing based on the instruction provided by the program code.

Further, the program code that is read out from the storage medium may be written into a memory included in a function expansion board inserted into the computer, or a memory included in a function expansion unit connected to the computer. Then, based on the instruction of the program code, a CPU included in the function expansion board or the function expansion unit may execute all or a part of the actual processing to realize the above-described functions.

The above-described embodiments are merely the examples for embodying the present invention, and many variations are possible without departing from the essential spirit of the present invention. Further, each of the exemplary embodiments can be combined as appropriate. Furthermore, the user may arbitrarily select any one of the first, the second, and the third exemplary embodiments in order to cause each of the communication apparatuses to operate according to the selected exemplary embodiment.

According to the aspect of the present invention, transmission of the service information is restricted according to the predetermined conditions. Thus, it is possible to prevent the communication apparatus from executing unnecessary connection processing.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-093887 filed Apr. 26, 2013, which is hereby incorporated by reference herein in its entirety.

The invention claimed is:

1. A communication apparatus comprising:
one or more processors; and
one or more memories including instructions that, when executed by the processor(s), cause the apparatus to:
receive a request signal for causing another communication apparatus to acquire service information provided by the communication apparatus while the wireless connection with said another communication apparatus to be established by execution of the wireless connection processing with said another communication apparatus is not established;

1) transmit a response signal to the request signal in a case where the request signal is a query signal for specifying a service,
2) not transmit a response signal to the request signal, on a basis of number of other communication apparatuses to which the communication apparatus is wirelessly connected, in a case where the request signal is a signal which requests the service information provided by the communication apparatus without specifying a service; and
establish the wireless connection by execution of the wireless connection processing with said another communication apparatus, in a case where the response signal is transmitted and establishing the wireless connection with said another communication apparatus is determined.

2. The communication apparatus according to claim 1, wherein the case where the request signal is a signal for requesting information on a service of the communication apparatus without specifying a service is a case where the request signal is a signal using a wildcard.

3. The communication apparatus according to claim 1, wherein the communication apparatus acquires service information provided by said another communication apparatus before the connection processing with said another communication apparatus is executed.

4. The communication apparatus according to claim 1, wherein the communication apparatus and said another communication apparatus execute communication based on IEEE 802.11 series.

5. The communication apparatus according to claim 1, wherein the request signal is a Service Discovery Query signal compliant with the Wi-Fi Direct standard.

6. The communication apparatus according to claim 1, wherein in a case where a response signal to the request signal is transmitted, the communication apparatus performs wireless connection processing compliant with the Wi-Fi Direct standard with the another communication apparatus.

7. The communication apparatus according to claim 1, wherein in a case where the request signal is received while wireless connection is established with the another communication apparatus, a response signal to the request signal is transmitted even if the request signal is a signal for requesting information on a service of the communication apparatus without specifying a service.

8. The communication apparatus according to claim 1, wherein the request signal is a signal to be transmitted by the another communication apparatus and different from a probe request and a probe response compliant with the IEEE 802.11 series in a case where the communication apparatus and the another communication apparatus communicate the probe request and the probe response compliant with the IEEE 802.11 series.

9. The communication apparatus according to claim 1, wherein the response signal to the request signal is a Service Discovery Response signal compliant with the Wi-Fi Direct standard.

10. The communication apparatus according to claim 1, wherein the state of not accepting any more wireless connection is a state in which number of apparatuses to which the communication apparatus is wirelessly connected has reached maximum number of connectable communication apparatuses.

11. A control method for a communication apparatus comprising:
receiving a request signal for causing another communication apparatus to acquire service information provided by the communication apparatus while the wireless connection with said another communication apparatus to be established by execution of the wireless connection processing with said another communication apparatus is not established; and 1) transmitting a response signal to the request signal in a case where the request signal is a query signal for specifying a service, and 2) not transmitting a response signal to the request signal, on a basis of number of other communication apparatuses to which the communication apparatus is wirelessly connected, in a case where the request signal is a signal which requests the service information provided by the communication apparatus without specifying a service; and establishing the wireless connection by execution of the wireless connection processing with said another communication apparatus, in a case where the response signal is transmitted and establishing the wireless connection with said another communication apparatus is determined.

12. A non-transitory computer readable storage medium storing a program for causing a computer to perform operations to operate as a communication apparatus comprising:

receiving a request signal for causing said-another communication apparatus to acquire service information provided by the communication apparatus while the wireless connection with said another communication apparatus to be established by execution of the wireless connection processing with said another communication apparatus is not established; and 1) transmitting a response signal to the request signal in a case where the request signal is a query signal for specifying a service, and 2) not transmitting a response signal to the request signal, on a basis of number of other communication apparatuses to which the communication apparatus is wirelessly connected, in a case where the request signal is a signal which requests the service information provided by the communication apparatus without specifying a service and establishing the wireless connection by execution of the wireless connection processing with said another communication apparatus, in a case where the response signal is transmitted and establishing the wireless connection with said another communication apparatus is determined.

\* \* \* \* \*